US009834169B2

(12) United States Patent
Heyer et al.

(10) Patent No.: US 9,834,169 B2
(45) Date of Patent: Dec. 5, 2017

(54) DEVICE AND METHOD FOR ACTIVATING A PASSENGER PROTECTION MEANS FOR A VEHICLE, MANUFACTURING METHOD FOR MANUFACTURING THE DEVICE, AND PASSENGER PROTECTION SYSTEM FOR A VEHICLE

(71) Applicant: Robert Bosch GmbH, Stuttgart (DE)

(72) Inventors: Klaus Heyer, Freiberg (DE); Rudolf Heinz, Renningen (DE); Horst Jung, Fellbach (DE); Uwe Iben, Calw-Heumaden (DE); Raed Hamada, Stuttgart (DE); Werner Nitschke, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/114,603

(22) PCT Filed: Jan. 9, 2015

(86) PCT No.: PCT/EP2015/050346
§ 371 (c)(1),
(2) Date: Jul. 27, 2016

(87) PCT Pub. No.: WO2015/110300
PCT Pub. Date: Jul. 30, 2015

(65) Prior Publication Data
US 2016/0339865 A1 Nov. 24, 2016

(30) Foreign Application Priority Data

Jan. 27, 2014 (DE) .................. 10 2014 201 419

(51) Int. Cl.
*B60R 21/274* (2011.01)
*B60R 21/272* (2006.01)
*B60R 21/264* (2006.01)

(52) U.S. Cl.
CPC .......... *B60R 21/274* (2013.01); *B60R 21/264* (2013.01); *B60R 21/272* (2013.01)

(58) Field of Classification Search
CPC ............... B60R 21/274; B60R 21/264; B60R 2021/2642; B60R 2021/2648
See application file for complete search history.

(56) References Cited

U.S. PATENT DOCUMENTS 5,226,669 A   7/1993  Roe et al.
5,601,309 A   2/1997  Bender et al.
(Continued)

FOREIGN PATENT DOCUMENTS

DE      19532022      3/1997
DE    102007028806   12/2007
(Continued)

OTHER PUBLICATIONS

International Search Report dated Mar. 11, 2015, of the corresponding International Application PCT/EP2015/050346, filed on Jan. 9, 2015.

*Primary Examiner* — James A English
(74) *Attorney, Agent, or Firm* — Norton Rose Fulbright US LLP; Gerard Messina

(57) ABSTRACT

A device for activating a passenger protection unit for a vehicle. The device includes a fuel element chamber having at least one fuel element, which is designed to generate a hot gas for activating the passenger protection unit by combustion, the fuel element chamber having an outlet opening for releasing the hot gas into the passenger protection unit, and the pressure container being designed to store a pressurized cold gas, the pressure container having at least one opening (Continued)

for the controlled release of the cold gas into the fuel element chamber.

17 Claims, 5 Drawing Sheets

(56) References Cited

U.S. PATENT DOCUMENTS

| | | | |
|---|---|---|---|
| 5,642,903 | A | 7/1997 | Headley |
| 5,669,629 | A * | 9/1997 | Rink ............... B60R 21/264 |
| | | | 280/741 |
| 6,254,128 | B1 | 7/2001 | Albrecht et al. |
| 8,419,057 | B2 | 4/2013 | Stevens |
| 2011/0049851 | A1* | 3/2011 | Stevens ............ B60R 21/272 |
| | | | 280/741 |
| 2015/0091284 | A1* | 4/2015 | Kovacic ............ B60R 21/261 |
| | | | 280/737 |
| 2015/0210243 | A1* | 7/2015 | Wasserman ....... B60R 21/268 |
| | | | 280/736 |
| 2016/0059820 | A1* | 3/2016 | Wolf ................ B60R 21/268 |
| | | | 280/742 |

FOREIGN PATENT DOCUMENTS

| | | |
|---|---|---|
| EP | 0715993 | 6/1996 |
| EP | 0944504 | 9/1999 |
| JP | 2001080449 A | 3/2001 |
| JP | 2008037415 A | 2/2008 |
| WO | 9726158 | 7/1997 |
| WO | 98/28169 | 7/1998 |
| WO | 0021799 | 4/2000 |

* cited by examiner

DEVICE AND METHOD FOR ACTIVATING A PASSENGER PROTECTION MEANS FOR A VEHICLE, MANUFACTURING METHOD FOR MANUFACTURING THE DEVICE, AND PASSENGER PROTECTION SYSTEM FOR A VEHICLE

FIELD

The present invention relates to a device for activating a passenger protection unit for a vehicle and to a corresponding method, to a manufacturing method for manufacturing such a device, and to a passenger protection system for a vehicle.

BACKGROUND INFORMATION

Passenger protection units, such as restraint systems for protecting the occupants of a vehicle during an accident, have been part of the related art for many years. Frequently airbags are used, whose bag is inflated by gas generated in gas generators in the event of a collision. The gas generators are operated either pyrotechnically or with the aid of compressed gas, or using a combination of both forms. In the combined design, the gas generators are also referred to as hybrid gas generators.

To be able to cover the increased requirements in recent years, 2- or 3-stage gas generators are frequently used. In these, the outflowing gas amount is defined during testing and may be emitted later during use in two stages of 60% and 100%, for example. To achieve easy variability, e.g., a 3-stage airbag may include a bypass or a pin puller, which may be opened if needed.

European Patent No. EP 0 715 993 A2 describes a hybrid gas generator for safety systems in motor vehicles in which a movable piston for destroying a bursting diaphragm closing the compressed gas container is provided.

SUMMARY

Against this background, the approach presented here introduces a device for activating a passenger protection unit for a vehicle, a method for activating a passenger protection unit for a vehicle, furthermore a manufacturing method for manufacturing a device for activating a passenger protection unit, and a passenger protection system for a vehicle. Advantageous embodiments are derived from the description below.

A device for activating a passenger protection unit which, in addition to a fuel element chamber for generating hot gas, includes a pressure container for outputting cold gas, which is coupled to the fuel element chamber via an opening, and allows the gas amount exiting into the passenger protection unit to be deliberately controlled in terms of time and volume. For example, in the event of a collision, the gas amount may be emitted from the pressure container directly at the start of the collision, or at a later point in time, into the fuel element chamber, and from the fuel element chamber into the passenger protection unit, e.g., the bag of an airbag. In this way, the point in time of the gas emission by the device and the gas amount are definable.

The present invention allows a hybrid gas generator to be adapted to an individual collision situation, without necessitating an increase in the number of the available ignition circuits. For implementing an example embodiment of the present invention, for example, two ignition circuits are sufficient.

The proposed individual adaptation of the gas amount holds a high potential for improving the protective function of the passenger protection unit assigned to the gas generator.

Advantageously, the hybrid gas generator described here allows the adaptivity of the gas amount to be increased, while at the same time allowing already established lightweight and small configurations of the hybrid generator to be preserved.

A device for activating a passenger protection unit for a vehicle is introduced, the device including the following features:

a fuel element chamber including at least one fuel element, which is designed to generate a hot gas for activating the passenger protection unit by combustion, the fuel element chamber having an outlet opening for releasing the hot gas into the passenger protection unit; and a pressure container for storing a pressurized cold gas, the pressure container having at least one opening for releasing the cold gas into the fuel element chamber.

The device may be installed in the vehicle. The passenger protection unit may be a reversible or irreversible unit of the vehicle for protecting an occupant of the vehicle from injuries during a collision of the vehicle. The fuel element chamber may be coupled to the passenger protection unit directly via the outlet opening or, e.g., via a connecting line. The fuel element may be present in tablet form, for example, and ignited pyrotechnically to start the combustion process generating the gas. The hot gas generated by the combustion of the fuel element may be conducted through the outlet opening of the fuel element chamber into the passenger protection unit for activating the passenger protection unit. The pressure container may be coupled via the opening to the fuel element chamber to conduct the cold gas into the fuel element chamber.

According to one specific embodiment, a controlled release of the cold gas through the opening of the pressure container into the fuel element chamber may take place.

According to one specific embodiment of the device, the pressure container may be situated within the fuel element chamber. For example, the pressure container may have a smaller size than the fuel element chamber and be situated completely within the fuel element chamber. In this way, the fluidic coupling of the pressure container to the fuel element chamber for the multi-stage activation of the passenger protection unit connected to the device may be achieved while optimally saving installation space.

Furthermore, the device may include a valve for controlling a volume flow of the cold gas through the opening of the pressure container. The valve may in particular be suitable for partially or completely opening and/or closing the opening. This specific embodiment allows the time and volume of the supply of the passenger protection unit with the cold gas from the pressure container to be readily adapted to an individual collision situation.

For example, the valve may be situated outside the pressure container and/or within the fuel element chamber. In addition to advantageous installation space savings, the valve may also be effectively protected against damage in this specific embodiment.

According to one specific embodiment, the valve may be designed to effectuate in a first valve position that a piston of the device, which is movably situated in relation to the at least one opening of the pressure container, unblocks the opening to allow the cold gas to be released into the fuel element chamber. The valve may be appropriately designed to effectuate in a second valve position that the piston closes the opening to suppress the release of the cold gas into the fuel element chamber. In this way, it is possible to achieve the advantage of controlling the volume flow of the cold gas preferably exactly.

According to one specific embodiment of the device, both the fuel element chamber and the pressure container may have a ring shape. This allows the device to be implemented in a preferably compact, and thus advantageous, shape, for example toroidal.

Alternatively, the fuel element chamber and the pressure container may each have a tube shape. For example, the fuel element chamber and the pressure container may each have a cylindrical design, and the opening may be situated on an end face of the pressure container, and the outlet opening may be situated on an end face of the fuel element chamber. This specific embodiment also allows the installation space required for the device to be kept advantageously small. Moreover, in this configuration, the device may be manufactured particularly quickly and cost-effectively.

The opening for releasing the cold gas may be situated on a side of the pressure container facing away from the outlet opening. In this way, a port for receiving a control signal for controlling an opening state of the opening for releasing the cold gas may be situated on a side of the device facing away from the passenger protection unit.

Furthermore, a passenger protection system for a vehicle is introduced, including the following features:

a device for activating a passenger protection unit for a vehicle according to one of the preceding specific embodiments; and a passenger protection unit, which is connected to the device, to be activated with the aid of the hot gas and/or cold gas generated in the device.

Furthermore, a method for activating a passenger protection unit for a vehicle is introduced, the method including the following steps:

igniting at least one fuel element situated in a fuel element chamber to generate a hot gas by combustion of the fuel element and release it through an outlet opening in the fuel element chamber into the passenger protection unit in order to activate the passenger protection unit; and releasing a pressurized cold gas from a pressure container through at least one opening of the pressure container to the fuel element chamber to further activate the passenger protection unit.

The method may be carried out, for example, by a corresponding device according to one of the above-described specific embodiments. An object of the present invention may also be achieved quickly and efficiently by this embodiment variant of the present invention in the form of a method. For example, the step of releasing may take place at a predefined point in time after the step of igniting, e.g., to extend the function of the passenger protection unit by an advantageous time period or to activate the passenger protection unit in several consecutive steps. The step of releasing may also be repeatedly carried out corresponding to a number of activation stages.

Furthermore, a manufacturing method for manufacturing a device for activating a passenger protection unit for a vehicle is introduced, the manufacturing method including the following steps:

providing a fuel element chamber, at least one fuel element and a pressure container, the fuel element being designed to generate a hot gas for activating the passenger protection unit by combustion, the fuel element chamber having an outlet opening for releasing the hot gas into the passenger protection unit, and the pressure container being designed to store a pressurized cold gas and having at least one opening for releasing the cold gas into the fuel element chamber; and situating the at least one fuel element and the pressure container in the fuel element chamber.

A device may presently be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, in addition to other software modules.

Embodiments of the present invention are described in greater detail below based on the figures, by way of example.

DETAILED DESCRIPTION OF EXAMPLE EMBODIMENTS

Figure 1:
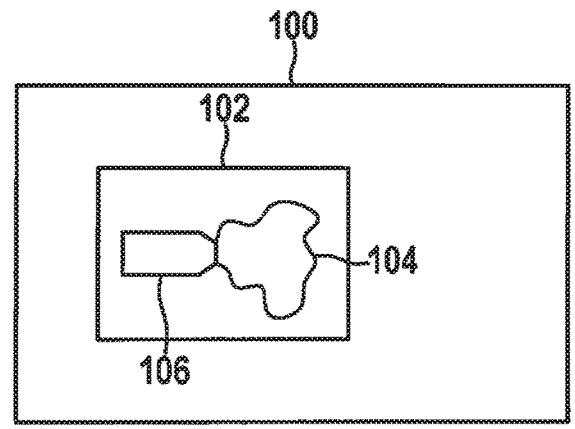
FIG. 1 shows a schematic diagram of a vehicle including a passenger protection system according to one exemplary embodiment of the present invention.

In the following description of favorable exemplary embodiments of the present invention, identical or similar reference numerals are used for similarly acting elements shown in the different figures, and a repeated description of these elements is dispensed with.

Based on a schematic diagram, FIG. 1 shows a vehicle 100, which is equipped with a passenger protection system 102 according to one exemplary embodiment of the present invention. Vehicle 100 may be a road-bound vehicle, such as a passenger car or a truck. Passenger protection system 102 is installed in vehicle 100 and includes passenger protection unit 104 and a device 106 for activating passenger protection unit 104, which is coupled to passenger protection unit 104.

Passenger protection system 102 is designed here to protect an occupant of vehicle 100 from injuries during a collision of vehicle 100. For this purpose, passenger protection unit 104 is implemented as an airbag here, more precisely as a front airbag situated, for example, in the steering wheel of vehicle 100.

Device 106 is a hybrid gas generator, which is designed to supply a bag of airbag 104 in the event of a collision both with pyrotechnically generated hot gas and with cold gas stored in a pressure container.

Other embodiments of passenger protection system 102 which are based on hybrid gas generation are also possible.

Figure 2:
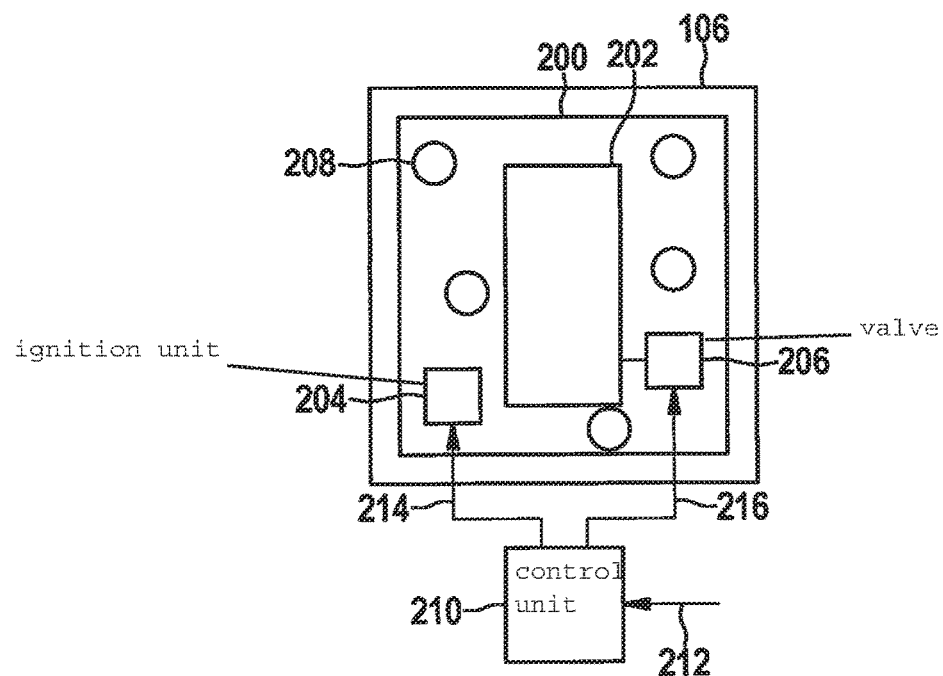
FIG. 2 shows a block diagram of a device for activating a passenger protection unit for a vehicle, according to one exemplary embodiment of the present invention.

FIG. 2 shows a block diagram of one exemplary embodiment of device 106 for activating a passenger protection unit for a vehicle from FIG. 1. Device or hybrid gas generator 106 includes a fuel element chamber 200, a pressure container 202, an ignition unit 204, and a valve 206. Fuel element chamber 200 includes at least one fuel element 208, by way of example a multitude of fuel elements 208 here, which are designed to generate a hot gas for activating the passenger protection unit (not shown here) coupled to device 106 by combustion. The fuel element or fuel elements 208 may be situated at one or multiple suitable positions within fuel element chamber 200. Pressure container 202 is designed to store a cold gas under pressure and to deliberately emit it in order to be able to further activate the passenger protection unit, in addition to the hot gas generated with the aid of fuel elements 208. Ignition unit 204 is designed to ignite at least one of fuel elements 208 and thus initiate the combustion process of fuel elements 208 for generating the hot gas. Valve 206 is designed to control a release of the cold gas from the pressure container as needed.

In the exemplary embodiment shown in FIG. 2, pressure container 202 has a smaller circumference than fuel element chamber 200 and is situated completely within fuel element chamber 200. According to one alternative exemplary embodiment, pressure container 202 may also be situated in a subarea within fuel element chamber 200.

In the illustration in FIG. 2, hybrid gas generator 106 is connected to a control unit 210 via an interface, for example a CAN bus of the vehicle. In the exemplary embodiment shown in FIG. 2, control unit 210 is designed to receive a collision signal 212 indicating an imminent or an onset of collision of the vehicle, and, via the interface with device 106, to output an ignition signal 214 to ignition unit 204 and a valve control signal 216 to valve 206. Device 106 is designed to supply the assigned passenger protection unit deliberately with the hot gas and the cold gas in response to ignition signal 214 and valve control signal 216.

Figure 3:
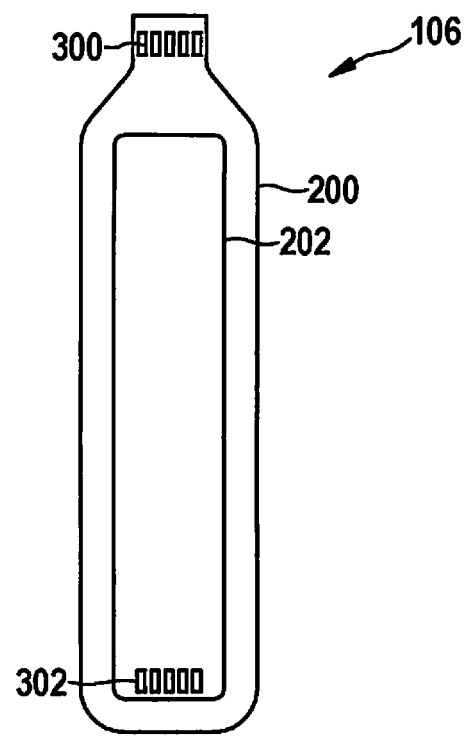
FIG. 3 shows a schematic diagram of the device for activating a passenger protection unit in an exemplary tubular design.

Based on a schematic diagram, FIG. 3 shows an exemplary tube design of hybrid gas generator 106 of the present invention introduced here. As the illustration in FIG. 3 shows, both fuel element chamber 200 and pressure container 202 have a tubular design. Pressure container 202 again has a smaller size than fuel element chamber 200 and is completely enclosed by fuel element chamber 200.

Fuel element chamber 200 tapers toward the top in a bottle shape and ends in a gas outlet, formed by a multitude of outlet openings 300, for supplying the connected passenger protection unit with gas. The tubular pressure container 202 has a multitude of openings 302 at its bottom end for releasing the cold gas from pressure container 202 into fuel element chamber 200. Pressure container 202 is situated in fuel element chamber 200 in such a way that the cold gas, after exiting through openings 302, flows laterally from pressure container 202 in fuel element chamber 200 to the top and, like the hot gas, reaches the coupled passenger protection unit, for example an airbag, via outlet 300.

In exemplary hybrid gas generator 106 shown in FIG. 3, pressure container 202 forms an inner part which is separate from chamber 200 including the pyrotechnics. In the idle state of device 106, outlet 300 to the airbag is sealed by a bursting element, which is not shown here and which is destroyed by the pressure developing during the combustion process. The pyrotechnically generated gas may tear open the cover in the vehicle and activate the passenger protection unit, e.g., inflate the bag of the airbag.

The gas present in pressure container 202 may be emitted via the valve, which is not shown here, at any arbitrary point in time and in a defined gas amount into fuel element chamber 200, and from there into the passenger protection unit.

Figure 4:
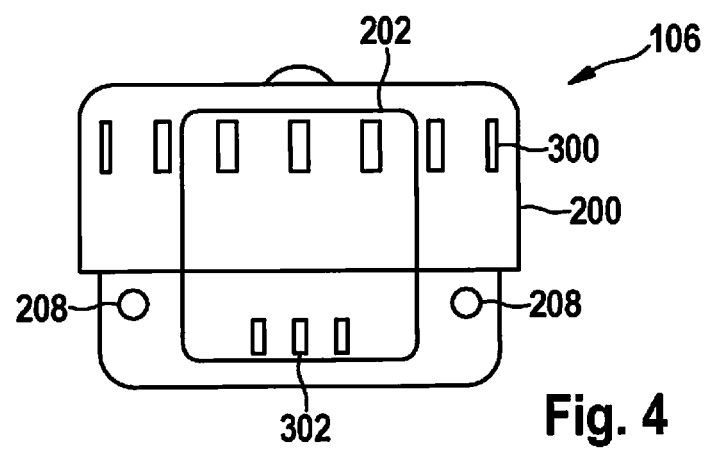
FIG. 4 shows a schematic diagram of the device for activating a passenger protection unit in an exemplary annular design.

Based on a further schematic diagram, FIG. 4 shows an exemplary ring design of hybrid gas generator 106 of the present invention introduced here. Here, both fuel element chamber 200 and pressure container 202 have a toroidal design, which is why the expression "doughnut shape" is also used to illustratively describe this gas generator configuration. Pressure container 202 again has a smaller circumference than fuel element chamber 200 and is completely enclosed by fuel element chamber 200 including fuel elements 208. As with the straight tubular design, pressure container 202 also in this instance again has at least one opening 302 in the bottom area for the cold gas to exit pressure container 202 into fuel element chamber 200. Via the multitude of outlet openings 300, both the hot gas exits fuel element chamber 200 and the cold gas exits pressure container 202 for activating the connected passenger protection unit.

Figure 5:
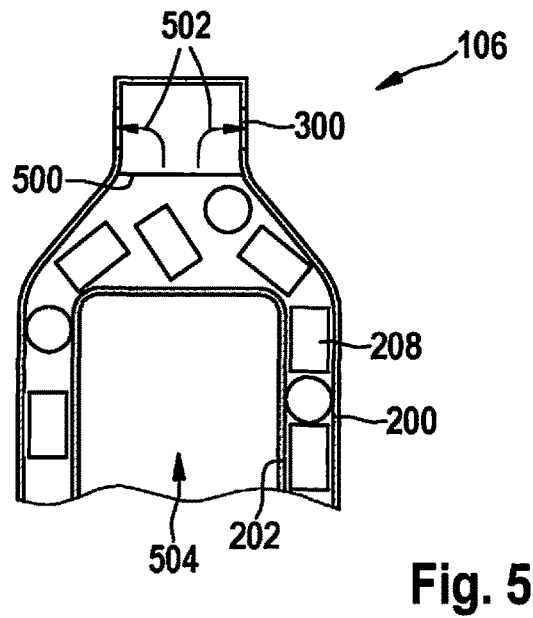
FIG. 5 shows a detailed illustration of the tubular device from FIG. 3, according to one exemplary embodiment of the present invention.

Based on a detailed illustration of the exemplary tubular device 106 from FIG. 3, FIG. 5 illustrates the gas exiting fuel element chamber 200. As was already mentioned, a bursting element 500 in the form of a bursting disk or diaphragm, for example, is provided upstream from gas outlet 300 of fuel element chamber 200. Fuel elements 208 are present in tablet form, for example, as shown in FIG. 5. To activate the passenger protection unit coupled to device 106 in the event of a collision, the combustion of fuel elements 208 generates a hot gas 502, whose pressure is sufficient to destroy bursting element 300 and for gas to reach the passenger protection unit via outlet 300. A flow progression of hot gas 502 out of fuel element chamber 200 is identified with the aid of directional arrows in the illustration in FIG. 5.

Gas fraction 502 of the pyrotechnics is activated, for example, by a squib of device 106 and, depending on the embodiment of gas generator 106, generates approximately 40% to 60% of the maximum gas volume. The pressure generated by the pyrotechnic combustion destroys the diaphragm or bursting disk 500 to the outside toward the airbag. A cold gas amount 504 present in pressure tank 202 may subsequently be emitted deliberately, i.e., in a controlled or regulated manner, via the valve, which is not shown here.

Figure 6:
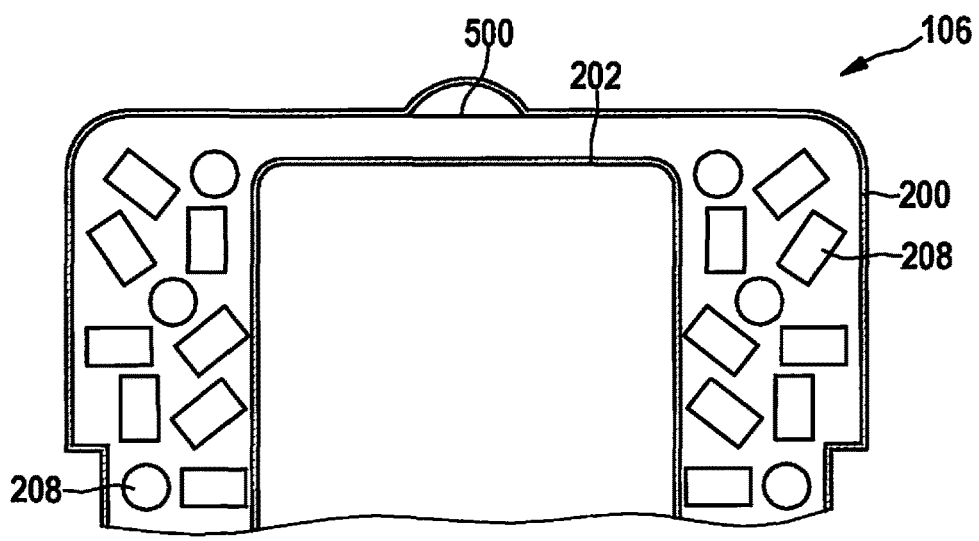
FIG. 6 shows a detailed illustration of the annular device from FIG. 4, according to one exemplary embodiment of the present invention.

In a further detailed illustration, FIG. 6 shows the gas exit in the exemplary annular design of gas generator 106 from FIG. 4. Once again, the flow path of the gas through fuel element chamber 200 and, subsequent to the destruction of bursting element 500, out of the outlet in the direction of the passenger protection unit is identified with the aid of arrows in the illustration.

Figure 7:
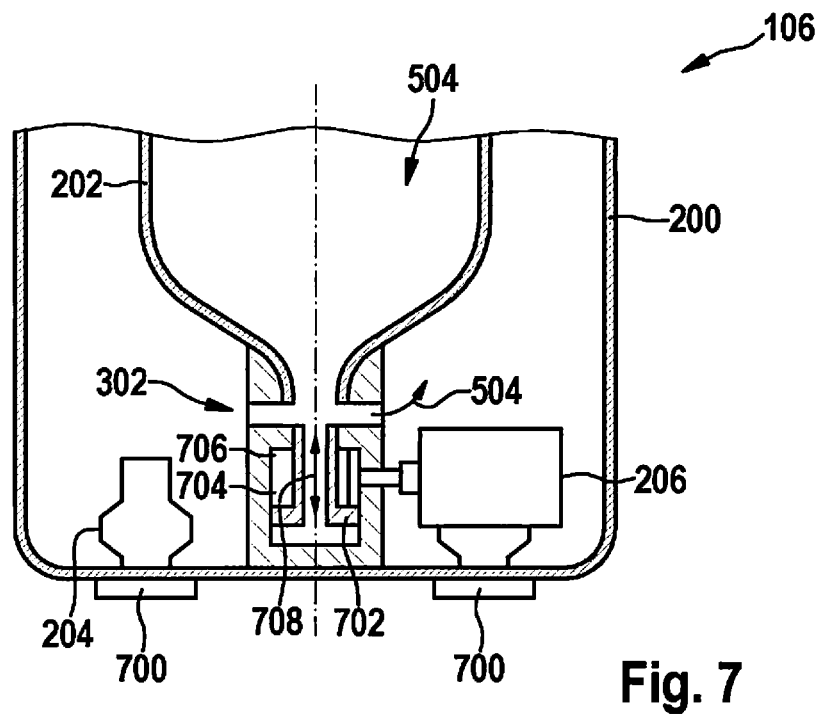
FIG. 7 shows a detailed illustration of a valve control unit of the device for activating a passenger protection unit for a vehicle, according to one exemplary embodiment of the present invention.

Based on a further detailed illustration of device 106, FIG. 7 describes an exemplary mode of operation for gas generation in adaptive hybrid generator 106. Ignition unit 204 of the device is shown, which is designed as a squib situated on the bottom of fuel element chamber 200 here. Squib 204 is designed to initiate a combustion of the fuel elements, which are not shown here, for generating the hot gas fraction of hybrid gas generator 106. Squib 204 is supplied with the required voltage for this purpose via an electrical contact 700.

The detailed illustration in FIG. 7 furthermore shows the operating principle of controlling the valve of adaptive hybrid generator 106 for the deliberate and controlled emission of cold gas 504 from pressure container 202 into fuel element chamber 200. For this purpose, device 106 includes a unit for unblocking and blocking the at least one opening 302 of pressure container 202. In addition to valve or pilot valve 206, this unit includes a piston 702, which is movably situated in relation to the at least one opening 302, and a spring element 706 situated in a spring chamber 704 next to piston 702.

As the illustration in FIG. 7 shows, pilot valve 206 is situated outside pressure container 202 in the interior of fuel element chamber 200 on the bottom of the same, opposite ignition unit 204. Valve 206 is supplied with voltage via a further electrical contact 700. In the exemplary embodiment shown in FIG. 7, valve 206 is designed as a ball valve and directly connected to spring chamber 704. Piston 702 is designed to be moved via a position of pilot valve 206, in cooperation with spring 706, in a piston stroke direction 708 identified with the aid of a double arrow in the illustration in relation to opening 302 in such a way that it partially or completely unblocks or blocks opening 302.

According to one exemplary embodiment of the hybrid gas generator introduced here, the activation of squib 204 via the combustion of the fuel elements present in chamber 200 generates approximately 50% of the gas amount provided in device 106. The further gas amount present in pressure container 202 is released via the activation of pilot valve 206. The point in time of the release and the gas amount are freely selectable, i.e., adaptable in accordance with the situation.

As in the other shown exemplary embodiments, gas outlet 302 of pressure container 202 to chamber 200 including the tablets is situated at one end—the bottom end here—of pressure container 202. Gas outlet 302 may be closed by piston 702. In the exemplary embodiment of the valve-controlled adaptive hybrid generator 106 shown in FIG. 7, piston 702 is held in the open position by spring 706 when the force on piston 702 is compensated for via the gap leaks. If chamber 704 in which spring 706 is situated is relieved by pilot valve 206 when the same is open, piston 702 closes gas outlet 302. If pilot valve 206 closes a vent hole, which is not shown, of spring chamber 704 again, for example via a ball seat, the pressure in spring chamber 704 equalizes again via the gap leaks; piston 702 opens gas outlet 302.

The illustration in FIG. 7 shows the valve control process of gas generator 106 at an operating point at which pilot valve 206 is closed. Accordingly, piston 702 exposes gas outlet 302, and a predetermined volume flow of cold gas 504 may flow via opening 302 out of pressure container 202 into fuel element chamber 200, and out of the same into the coupled passenger protection unit, as an arrow in the representation illustrates. If pilot valve 206 is open at a further operating point of the valve control process, piston 702 closes gas outlet 302, and the gas supply to the passenger protection unit is suppressed.

Gas amount 504 may be emitted from pressure container 202 directly at the start of a collision or at a later point in time, e.g., 50 ms after the start of a collision, into the passenger protection unit, for example the bag of an airbag. In this way, the point in time and the gas amount of the emission of cold gas 504 are definable. According to one exemplary embodiment, e.g., 10% or 20% of the total volume of cold gas 504 stored in pressure container 202 may be emitted into the passenger protection unit in each case at given points in time during a collision via the activation of valve 206.

Figure 8:
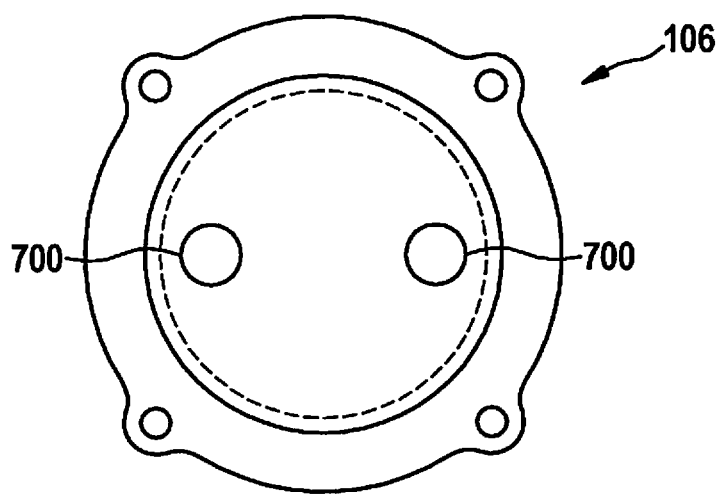
FIG. 8 shows a schematic diagram of one configuration of the device for activating a passenger protection unit for a vehicle, according to one exemplary embodiment of the present invention.

FIG. 8 shows an exemplary configuration of the valve-controlled hybrid gas generator 106 in a schematic diagram.

Shown is a view from beneath, including first contact 700 and second contact 700 for a plug connection of gas generator for supplying the ignition element and the valve of device 106 with voltage. It is apparent from the illustration in FIG. 8 that the design of the valve-controlled gas generator 106 introduced here is configured in such a way that existing gas generator shapes, such as the doughnut shape or the tube shape, may be preserved.

Figure 9:
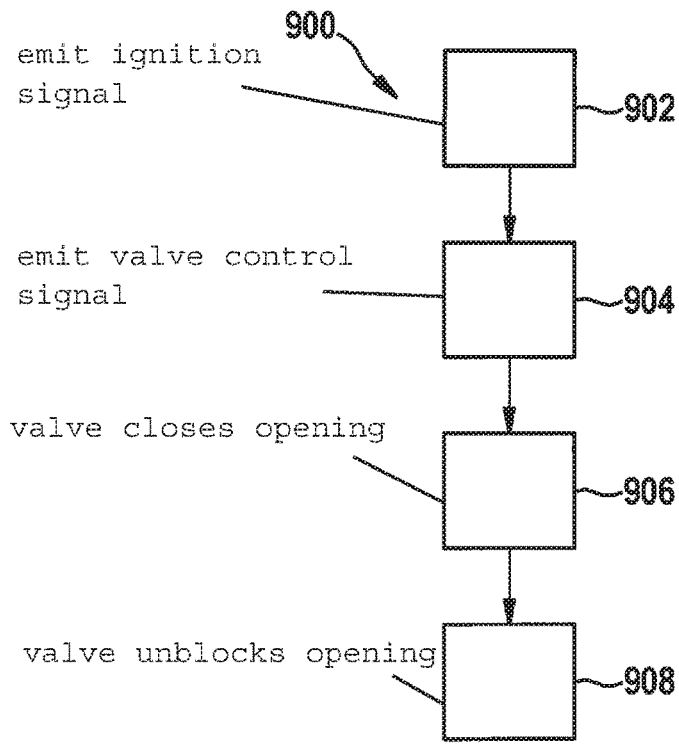
FIG. 9 shows a flow chart of a method for activating a passenger protection unit for a vehicle, according to one exemplary embodiment of the present invention.

FIG. 9 shows a flow chart of one exemplary embodiment of a method 900 for activating a passenger protection unit for a vehicle. Method 900 may be carried out in a device for activating a passenger protection unit for a vehicle, as it was introduced based on FIGS. 1 through 8. In a step 902, a control unit coupled to the device emits an ignition signal to an ignition unit of the device via a suitable interface. In response to the ignition signal, the ignition unit ignites a multitude of fuel elements situated in a fuel element chamber of device. A combustion of the fuel elements generates a hot gas for the initial activation of a passenger protection unit coupled to the device.

After a predefined time period, in a step 904, the control unit emits a valve control signal to a valve of the device via a further suitable interface. In response to the valve control signal, the valve unblocks an opening of a pressure container of the device to the fuel element chamber, to allow a predetermined amount of cold gas from the pressure container to exit into the fuel element chamber for the further activation of the passenger protection unit. In a step 906, the valve closes the opening in response to a second valve control signal. After a further predetermined time period, in a step 908, the valve unblocks the opening again in response to a third valve control signal of the control unit, to release a further predetermined amount of cold gas from the pressure container into the fuel element chamber.

Figure 10:
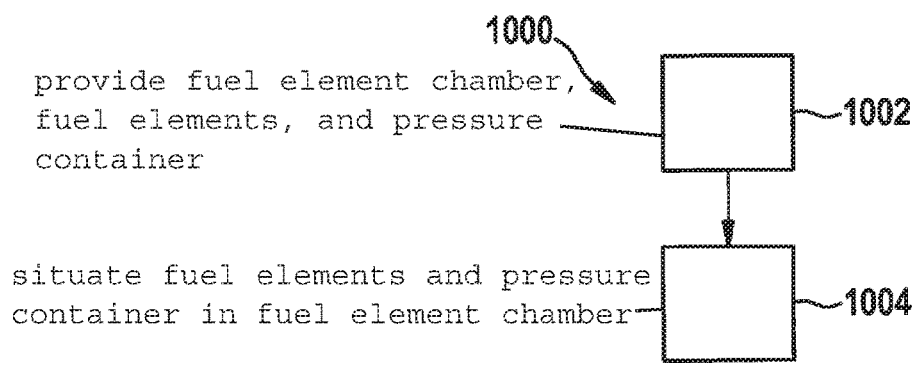
FIG. 10 shows a flow chart of a manufacturing method for manufacturing a device for activating a passenger protection unit for a vehicle, according to one exemplary embodiment of the present invention.

FIG. 10 shows a flow chart of one exemplary embodiment of a manufacturing method 1000 for manufacturing a device for activating a passenger protection unit for a vehicle, as described based on FIGS. 1 through 8. In a step 1002, a fuel element chamber for generating hot gas by combustion of fuel elements, a multitude of fuel elements, and a pressure container for storing cold gas are provided. In a step 1004, the fuel elements and the pressure container are situated in the fuel element chamber in such a way that both the fuel elements and the pressure container are completely enclosed by the fuel element chamber. The arrangement of the individual components with respect to each other is designed in such a way that an outlet opening of the fuel element chamber for releasing the hot gas into the passenger protection unit is situated at the top end of the device, and an opening of the pressure container for releasing the cold gas into the fuel element chamber is situated at a bottom end of the device.

The described exemplary embodiments shown in the figures are selected only by way of example. Different exemplary embodiments may be combined with each other completely or with respect to individual features. It is also possible to supplement one exemplary embodiment with features of another exemplary embodiment.

Moreover, the method steps introduced here may be carried out repeatedly and in a different order than the one described.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A device for activating a passenger protection unit for a vehicle, the device comprising:
   a fuel element chamber including at least one fuel element, which is designed to generate a hot gas for activating the passenger protection unit by combustion, the fuel element chamber having an outlet opening that releases the hot gas into the passenger protection unit;
   a pressure container storing a pressurized cold gas, the pressure container having at least one opening for a controlled release of the cold gas into the fuel element chamber;
   a valve for controlling the release of the cold gas through the at least one opening of the pressure container and into the fuel element chamber; and
   a control unit that receives a collision signal in response to a collision involving the vehicle, wherein, in response to the collision signal, the control unit generates a valve control signal to at least partially open the valve in response to the collision signal and transmits the valve control signal to the valve.

2. The device as recited in claim 1, wherein the pressure container is situated within the fuel element chamber.

3. The device as recited in claim 1, wherein the valve is situated at least one of: i) outside the pressure container, and ii) within the fuel element chamber.

4. The device as recited in claim 1, wherein the valve is designed to effectuate in a first valve position that a piston of the device, which is movably situated in relation to the at least one opening of the pressure container, unblocks the opening to allow the cold gas to be released into the fuel element chamber, and to effectuate in a second valve position that the piston closes the opening to suppress the release of the cold gas into the fuel element chamber.

5. The device as recited in claim 1, wherein the fuel element chamber and the pressure container each have a ring shape.

6. The device as recited in claim 1, wherein the fuel element chamber and the pressure container each have a cylindrical design, and the opening is situated on an end face of the pressure container, and the outlet opening is situated on an end face of the fuel element chamber.

7. The device as recited in claim 1, wherein:
   the control unit generates an ignition signal to ignite the at least one fuel element in response to the collision signal, and
   a time at which the control unit generates the ignition signal is different than a time at which the control unit generates the valve control signal.

8. The device as recited in claim 7, wherein the time at which the control unit generates the valve control signal occurs after than the time at which the control unit generates the ignition signal.

9. A passenger protection system for a vehicle, the passenger protection system comprising:
   a device for activating a passenger protection unit for a vehicle, the device including:
      a fuel element chamber including at least one fuel element, which is designed to generate a hot gas for activating the passenger protection unit by combustion, the fuel element chamber having an outlet opening that releases hot gas into the passenger protection unit,
      a pressure container storing a pressurized cold gas, the pressure container having at least one opening for a controlled release of the cold gas into the fuel element chamber;
      a valve for controlling the release of the cold gas through the at least one opening of the pressure container and into the fuel element chamber; and
      a control unit that receives a collision signal in response to a collision involving
      the vehicle, wherein, in response to the collision signal, the control unit generates a valve control signal to at least partially open the valve in response to the collision signal and transmits the valve control signal to the valve, wherein the passenger protection unit is connected to the device and is activated with the aid of at least one of the hot gas and the cold gas, generated in the device.

10. The passenger protection system as recited in claim 9, wherein:
    the control unit generates an ignition signal to ignite the at least one fuel element in response to the collision signal, and
    a time at which the control unit generates the ignition signal is different than a time at which the control unit generates the valve control signal.

11. The passenger protection system as recited in claim 10, wherein the time at which the control unit generates the valve control signal occurs after the time at which the control unit generates the ignition signal.

12. A method for activating a passenger protection unit for a vehicle, the method comprising:
    igniting at least one fuel element situated in a fuel element chamber to generate a hot gas by combustion of the fuel element and release the hot gas through an outlet opening in the fuel element chamber into the passenger protection unit to activate the passenger protection unit; and
    controlling a valve to from a pressure container through at least one opening of the pressure container to the fuel element chamber to further activate the passenger protection unit, wherein the controlling of the valve is performed in response to a valve control signal generated and transmitted by a control unit in response to a collision signal generated in response to a collision involving the vehicle.

13. The method as recited in claim 12, wherein:
    the control unit generates an ignition signal to ignite the at least one fuel element in response to the collision signal, and a time at which the control unit generates the ignition signal is different than a time at which the control unit generates the valve control signal.

14. The method as recited in claim 13, wherein the time at which the control unit generates the valve control signal occurs after the time at which the control unit generates the ignition signal.

15. A method for manufacturing a device for activating a passenger protection unit for a vehicle, the method comprising:

providing a fuel element chamber, at least one fuel element and a pressure container, the fuel element being designed to generate a hot gas for activating the passenger protection unit by combustion, the fuel element chamber having an outlet opening for releasing the hot gas into the passenger protection unit, and the pressure container being designed to store a pressurized cold gas and having at least one opening for a controlled release of the cold gas into the fuel element chamber;

situating the at least one fuel element and the pressure container in the fuel element chamber;

providing a valve for controlling the release of the cold gas through the at least one opening of the pressure container and into the fuel element chamber; and providing a control unit that generates and transmits a valve control signal in response to a collision signal that is generated in response to a collision involving the vehicle, wherein the valve at least partially opens in response to the valve control signal.

16. The method as recited in claim 15, wherein:

the control unit generates an ignition signal to ignite the at least one fuel element in response to the collision signal, and a time at which the control unit generates the ignition signal is different than a time at which the control unit generates the valve control signal.

17. The method as recited in claim 16, wherein the time at which the control unit generates the valve control signal occurs after the time at which the control unit generates the ignition signal.

* * * * *